(12) United States Patent
Bouvrie et al.

(10) Patent No.: US 12,332,891 B1
(45) Date of Patent: Jun. 17, 2025

(54) SEARCH SYSTEM OPTIMIZATION

(71) Applicant: Kayak Software Corporation, Stamford, CT (US)

(72) Inventors: Jacob Vincent Bouvrie, Arlington, MA (US); Tianbai Cui, Seabrook, NH (US)

(73) Assignee: KAYAK Software Corporation, Stamford, CT (US)

( * ) Notice: Subject to any disclaimer, the term of this patent is extended or adjusted under 35 U.S.C. 154(b) by 46 days.

(21) Appl. No.: 17/456,777

(22) Filed: Nov. 29, 2021

(51) Int. Cl.
*G06F 16/9538* (2019.01)
*G06F 16/2453* (2019.01)
*G06F 16/9535* (2019.01)

(52) U.S. Cl.
CPC .... *G06F 16/24545* (2019.01); *G06F 16/9535* (2019.01); *G06F 16/9538* (2019.01)

(58) Field of Classification Search
CPC .......... G06F 16/24545; G06F 16/9535; G06F 16/9538
See application file for complete search history.

(56) References Cited

U.S. PATENT DOCUMENTS

| | | | | |
|---|---|---|---|---|
| 6,360,205 | B1 * | 3/2002 | Iyengar | G06Q 50/188 |
| | | | | 705/5 |
| 7,249,122 | B1 * | 7/2007 | Bushee | G06F 16/951 |
| | | | | 709/219 |
| 9,710,572 | B2 * | 7/2017 | Zhu | G06F 16/951 |
| 10,248,912 | B1 * | 4/2019 | Robinson | G06Q 30/0627 |
| 11,544,258 | B2 * | 1/2023 | Anamanamuri | G06F 16/2471 |
| 2004/0078252 | A1 * | 4/2004 | Daughtrey | G06Q 10/02 |
| | | | | 705/5 |
| 2011/0022426 | A1 * | 1/2011 | Eijdenberg | G06Q 10/109 |
| | | | | 705/5 |
| 2018/0068235 | A1 * | 3/2018 | Garman | G06Q 50/14 |

OTHER PUBLICATIONS

Cho et al., "On the Properties of Neural Machine Translation: Encoder-Decoder Approaches," Semantics and Structure in Statistical Translation, Oct. 25, 2014, 103-111.
He et al., "Deep Residual Learning for Image Recognition," Proceedings of the IEEE Conference on Computer Vision and Pattern Recognition, 2016, pp. 770-778.
Srivastava et al., "Dropout: A Simple Way to Prevent Neural Networks from Overfitting," Journal of Machine Learning Research, 2014, 15:1929-1958.

* cited by examiner

*Primary Examiner* — Sherief Badawi
*Assistant Examiner* — Earl Elias
(74) *Attorney, Agent, or Firm* — Lee & Hayes, P.C.

(57) ABSTRACT

Methods, systems, and apparatus, including computer programs encoded on computer storage media, for optimizing a digital resource search. One of the methods includes receiving a search query that specifies one or more parameters including a first parameter for a web resource request; determining that the first parameter is a particular parameter; in response to determining that the first parameter is a particular parameter: determining, using a historical search database, historical search data; predicting a subset of databases that are predicted to have web resources that are more likely responsive to the search query than second web resources; and obtaining a dataset that includes a plurality of web resources that each satisfy at least one parameter of the search query or at least partially satisfy the first parameter; and generating a plurality of search results for the web resource request.

20 Claims, 3 Drawing Sheets

SEARCH SYSTEM OPTIMIZATION

TECHNICAL FIELD

This specification generally relates to computerized systems, methods and computerized programs for optimizing a search system, including reducing and otherwise optimizing computational resources used by a search system.

BACKGROUND

Search systems enable customers to use digital resources, e.g., data for websites or mobile applications, to search, book, and manage services. Without sufficient information, it is usually difficult for a search system to efficiently provide digital resources to client devices given data estimates and fluctuations in data. Further, it can be difficult for a search system to determine digital resources that represent services that have at least a threshold likelihood of being selected by a client device, e.g., based on route, price, or other factors. In particular, because of the very large number of digital resources that the search system must analyze to make recommendations for a client device and given computational limitations for a search system, the search system might not surface an optimal digital resource.

SUMMARY

In general, one aspect of the subject matter described in this specification can be embodied in methods that include the actions of receiving, by one or more computers over a network, a search query submitted from a client device, the search query specifying one or more parameters including a first parameter for a web resource request; determining that the first parameter is a particular parameter for which the one or more computers should access a subset of server systems; in response to determining that the first parameter is a particular parameter for which the one or more computers should access the subset of server systems: determining, by the one or more computers and using a historical search database, historical search data i) that was retrieved from a plurality of databases ii) that satisfies at least some of the one or more parameters for the web resource request; predicting, by the one or more computers and using the historical search data, a subset of databases a) from the plurality of databases b) that are predicted to have web resources that are more likely responsive to the search query than second web resources stored on a second, different subset of the plurality of databases; and obtaining, from the subset of databases, a dataset that includes a plurality of web resources that each satisfy at least one parameter of the search query or at least partially satisfy the first parameter; generating, by the one or more computers and using the plurality of web resources included in the dataset, a plurality of search results for the web resource request; and providing, to the client device, instructions to cause the client device to present a user interface that includes data for the plurality of search results.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations, predicting the subset of databases can include predicting, using the historical search data and the first parameter, the subset of databases.

In some implementations, obtaining the dataset can include receiving, from each database in the subset of databases, one or more web resources that are each partially responsive to the web resource request including a first web resource received from a first database and a second web resource received from a second database. Generating the plurality of search results can include generating a first search result using the first web resource obtained from the first database in the subset of databases and the second web resource obtained from the second database in the subset of databases.

In some implementations, determining the historical search data can include determining, using the historical search database, the historical search data i) that was retrieved from the plurality of databases ii) that includes multiple search results each of which satisfies all of the one or more parameters for the web resource request.

In some implementations, determining the historical search data can include determining one or more of a plurality of historical search queries, a plurality of historical search results, or a plurality of historical web resources that satisfy a threshold similarity to the search query.

In some implementations, the web resource request can include a travel reservation request. The plurality of web resources can include travel itineraries.

In some implementations, the first parameter for the search query can indicate that search results with layover candidates are responsive to the search query. Generating the plurality of search results can include generating, using a first web resource that identifies a first itinerary leg and a second web resource that identifies a second itinerary leg, a search result that has a total itinerary that includes the first itinerary leg and the second itinerary leg.

In some implementations, obtaining the dataset can include obtaining, from the subset of databases, the dataset that includes the plurality of web resources that each satisfy at least one parameter of the search query and satisfy the first parameter.

In some implementations, the plurality of databases can include the subset of databases and a second, disjoint subset of databases. The method can include: after obtaining the dataset, obtaining, from at least one database in the second, disjoint subset of databases, a second dataset that includes a second plurality of web resources; generating, using the second plurality of web resources included in the second dataset, a second plurality of search results for the web resource request; and providing, to the client device, instructions to cause the client device to present a user interface that includes second data for the second plurality of search results.

The subject matter described in this specification can be implemented in various embodiments and may result in one or more of the following advantages. In some implementations, the systems and methods described in this specification can reduce query response time, improve a likelihood that obtained web resources are responsive to the query, or both. For instance, the systems and methods described in this specification and reduce query response time by obtaining, from a subset of databases predicted to have web resources more responsive to the query than other databases, web resources that satisfy one or more parameters for the query compared to other systems that may obtain web resources from all databases. The systems and methods described in this specification can improve the accuracy of the subset of databases from which web resources are obtained by predicting, using data retrieved from a historical database, which databases are more likely to have responsive web resources. In some implementations, the systems and methods described in this specification can reduce a number of requests sent to external databases, and an amount of network bandwidth used, by predicting which databases are likely to have web resources that are most responsive to a received query.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
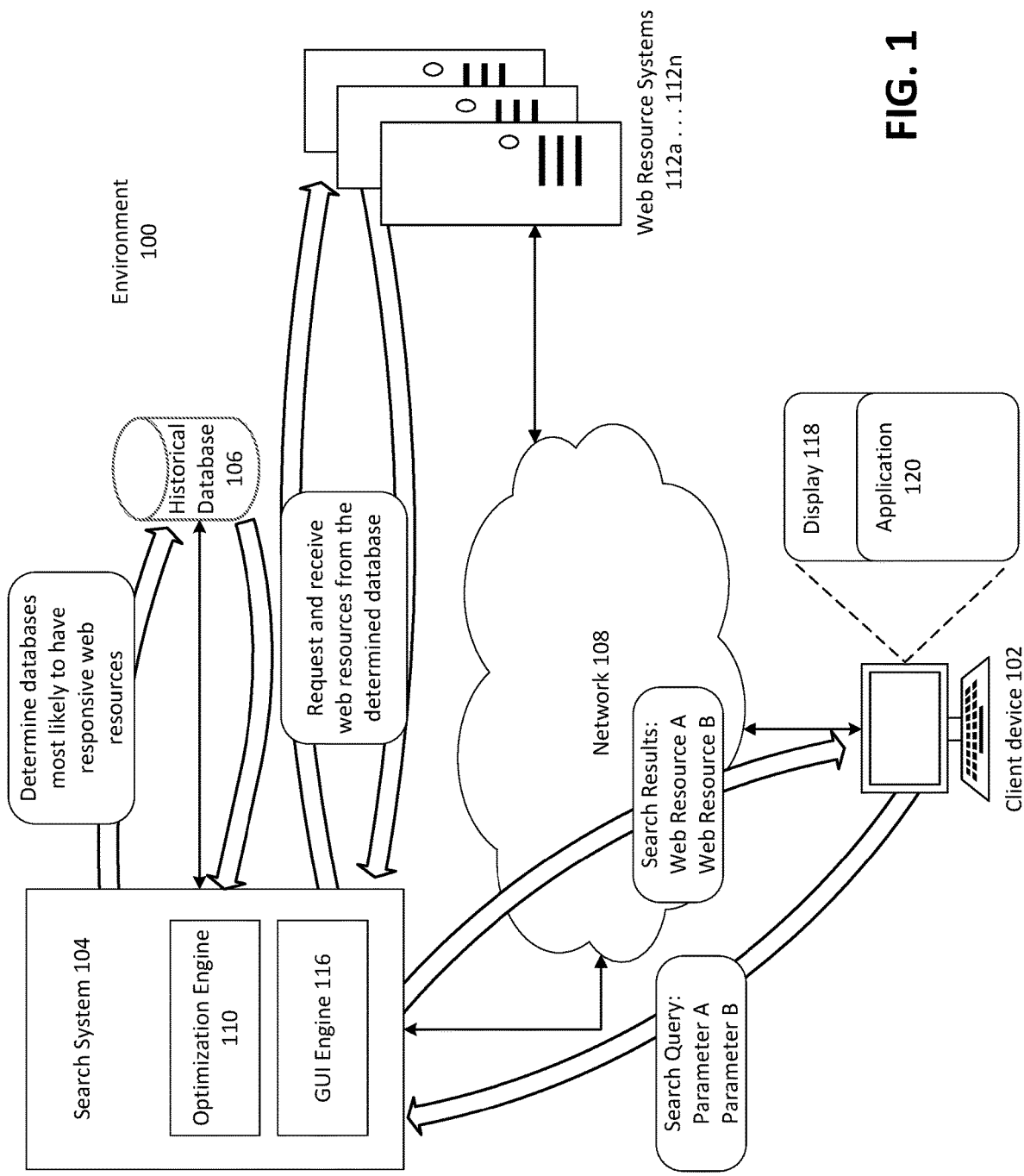
FIG. 1 depicts an example environment in which a search system predicts web resource systems that are most likely to have web resources that are responsive to a query.

Web-based systems can maintain websites that host a variety of web-based resources and provide requesting devices with content and services. The web-based resources and content can include text, e.g., text documents, books, etc.; images; videos; tweets; games; profiles, e.g., of people, services, companies, etc.; blockchains; informational services; product listings; service listings; or any combination of these. The provided services can include hosting the web-based resources, social networking, banking, search engines (e.g., including sorting and searching web-based resources product listings, or service listings based on customer queries), gaming, sales platforms (e.g., to purchase/sell a company's goods, or to purchase/sell a user's products), trading platforms (e.g., to trade securities, commodities, etc.), or any combination thereof.

As a number of web-based resources maintained by web-based systems increases, the web-based systems can take more time, computer resources, or both, to surface resources that are relevant to a query. For instance, because the number of search results responsive to a query can be large, web-based systems can consume a large number of computer resources determining web-based resources that are most relevant to the query. Particularly, this can be a problem when a search system that receives the query needs to retrieve data from one or more other systems managed by other entities and for which the search system is not necessarily optimized, e.g., the search system must use an application programming interface ("API") to access data on the other systems.

To address this, a web-based system is configured to receive a search query submitted from a client device that specifies one or more parameters for a web resource request and to determine if a first parameter for the web resource request is a particular parameter. This particular parameter can represent an amount of processing that the web-based system will likely need to perform to determine web resources responsive to the search query. For instance, the first parameter can indicate that the web-based system will need to combine data from multiple different external databases to determine at least some of the responsive web resources, which can require additional computational resources.

In response to determining that the first parameter is the particular parameter, the web-based system can predict a subset of multiple databases that are most likely to have the most responsive web resources. A most responsive web resource can be a web resource that is more likely to be responsive to the search query than other web resources. In some examples, the web-based system can combine multiple web resources to generate a single search result responsive to the search query. In these examples, the most responsive web resources can be resources that are used to generate each of the most responsive search results that the web-based system will provide to the client device.

The web-based system can then query the databases in the subset, e.g., the external systems that include these databases. In response, the web-based system can receive responses that each include web resources, or portions of web resources, that are responsive to the search query and at least partially satisfy the first parameter. The web-based system can then generate multiple web resources using the responses and provide the web resources to a requesting client device.

Predicting a relevant subset of the multiple databases that is relevant to the search query can enable the system to narrow the query to external systems. Narrowing the query to external systems to relevant databases can enable the web-based system to take less time, computer resources (e.g., memory or floating point operations per second, "FLOPS"), or both, than conventional searches, e.g., that apply a brute force search across all of the multiple databases. In some examples, narrowing the query to external systems to relevant databases can reduce the computational load for the external systems that do not have or are less likely to have relevant databases, e.g., reducing the memory or floating point operations per second, "FLOPS", thereby enabling the external systems that do not have or are less likely to have relevant databases to be more responsive to other, more relevant queries, e.g., by responding with lower latency.

FIG. 1 depicts an example environment 100 in which a search system 104 predicts web resource systems 112*a-n* that are most likely to have web resources that are responsive to a query. The search system 104 can receive, from the client device 102, a search query and determine multiple search results that are each responsive to the search query.

Because the number of potential web resources required to generate the search results responsive to the search query is large, e.g., greater than a threshold amount, and the amount of time required to determine those web resources is too long, e.g., greater than a threshold time period, the search system 104 will predict multiple databases from the web resource systems 112*a-n* that are most likely to have the most responsive web resources from which to retrieve web resources. The search system 104 will then use web resources from the predicted multiple databases to generate search results responsive to the search query.

For instance, the search system 104 can receive a search query submitted by a client device 102 that specifies one or more parameters, e.g., A and B, for a web resource request. The one or more parameters can be any appropriate types of parameters, such as key phrases, data sources, dates, times, or quantities for the search query.

The search system 104 analyzes the one or more parameters, e.g., A and B, included in the search query. For instance, the search system analyzes the one or more parameters to determine whether one of the parameters is a particular parameter for which the search system 104 should access a subset of databases. The particular parameter can indicate a number of databases that should be searched, a number of layovers for a flight, a type of database that should be searched, that multiple difference database sources should be searched, or another appropriate type of parameter for which the search system 104 will need to access multiple different web resource systems 112*a*-*n* to determine web resources responsive to the query.

In some examples, the search system 102 can use the particular parameter to determine how to search the web resource systems 112*a*-*n*. For instance, the search system 102 can use the particular parameter to determine one or more query parameters to use when querying the web resource systems 112*a*-*n*. The search system 102 can use the particular parameter to determine a first query for a first web resource system and a second, different query for a second web resource system. The first web resource system and the second web resource system are from the web resource systems 112*a*-*n*. In some implementations, the search system 102 can use the particular parameter to determine query parameters that are likely to increase the responsiveness of web resources provided by the corresponding web resource system 112*a*-*n* to which a query, that includes the query parameters, is sent.

The search system 104 can analyze each of the one or more parameters included in the search query until the search system 104 determines that the search query does not include the particular parameter or that the search query includes the particular parameter. For instance, the search system 104 can access a field, included in the search query, for each of the one or more parameters. The field can include an identifier for the parameter type or can be at a location in the search query that indicates the parameter type. The search system 104 can use the identifier or the location to determine whether the search query includes the particular parameter.

When the search system 104 determines that that search query does not include the particular parameter, or includes a value for the particular parameter that indicates that the search system 104 does not need to access the subset of databases, the search system 104 can process the search query using any appropriate process. For instance, the search system 104 can retrieve web resources responsive to the search query from the web resources systems 112*a*-*n*. The search system 104 can provide at least some of the retrieved web resources to the client device 102, e.g., in response to receipt of the search query.

When the search system 104 determines that the particular parameter is included in the one or more parameters, e.g., the parameter A, the search system 104 determines to search only a subset, e.g., a proper subset, of the web resource systems 112*a*-*n* for web resources responsive to the search query. To determine the subset of the web resource systems 112*a*-*n*, the search system can retrieve historical data from the historical database 106. Although FIG. 1 depicts the historical database 106 separate from the search system 104, the historical database 106 can be located in any appropriate component in the environment 100, including as part of the search system 104.

The historical data can indicate historical search results that were responsive to prior search queries. The prior search queries can be similar to the search query or dissimilar from the search query, e.g., with a different number of parameters, one or more parameters dissimilar from the search query, or both.

For instance, the search system 104, or another system, can receive one or more earlier search queries at least a threshold period of time before receiving the search query. The search system 104, or the other system, can store data in the historical database that identifies these search queries and search results, web resources, or both, that are responsive to the search queries. As described in this specification, a search result can include or otherwise identify multiple web resources. This can occur when a combination of two or more web resources is responsive to a search query instead of a single web resource.

The web resources identified by the historical data can include web resources that the search system 104, or another system, determined were responsive, at least in part, to the corresponding search query. For example, when the search system 104 receives a prior search query, the search system 104 can determine multiple web resources that are each at least partially responsive to the prior search query. The search system 104 can use the determined multiple web resources to generate multiple search results that are responsive to the prior search query. The search system 104 can store data for the multiple web resources, the multiple search results, or both, in the historical database 106. In this way, the search system 104 can include data for web resources in the historical data that the search system can later use when the particular parameter is in the one or more parameters for a search query.

To determine the subset of the web resource system 112*a*-*n*, the search system 104, e.g., an optimization engine 110 included in the search system 104, analyzes data from the historical database 106. For instance, the optimization engine 110 determines which prior search queries, which prior search results, which prior web resources, or a combination of two or more of these, have at least a threshold similarity to the search query received from the client device 102. For example, the optimization engine 110 can determine which prior search queries have at least a threshold quantity of parameters similar to, or the same as, the one or more parameters for the search query. The optimization engine 110 can determine which prior search results are responsive to at least a first threshold number of parameters from the one or more parameters included in the search query. The optimization engine 110 can determine which prior web resources are responsive to at least a second threshold number of parameters from the one or more parameters included in the search query. The first and the second threshold can be the same or different thresholds.

The optimization engine 110 can use a result of the analysis of the data from the historical database 106 to determine a subset of the web resource systems 112*a*-*n* from which to retrieve web resources. For instance, the optimization engine 110 can determine, as the subset, the web resource systems 112*a*-*n* that had web resources responsive to the prior search queries or used to generate the prior search results, or otherwise have at least the threshold similarity to the search query received from the client device 102.

In this way, the optimization engine 110 can be an engine that predicts a subset of databases from the multiple databases hosted by the web resource systems 112a-n that are predicted to have web resources likely to be most responsive to the search query. For instance, these web resources can be predicted to be more responsive than second web resources stored on a second, different subset of the multiple databases hosted by the web resources systems 112a-n.

The search system 104 obtains, from the subset of databases, web resources. For instance, each database from the subset of databases can be maintained by one of the web resources systems 112a-n. The search system 104 can send, to each of the web resource systems 112a-n that maintains a corresponding database from the subset of databases, a request for web resources responsive to the search query. These web resource systems 112a-n that each maintain a corresponding database from the subset of databases can be a corresponding subset of the web resource systems 112a-n.

The request can include at least some of the parameters from the search query. For instance, the request can include all of the parameters from the search query except for the particular parameter, e.g., the parameter A. The particular parameter can be a predetermined parameter. The search system 104 can include all parameters from the search query except the particular parameter when the search system will use the particular parameter to combine web resources received from the web resource systems 112a-n. In these examples, the particular parameter might not be required to determine any particular web resource. Instead, the search system 104 can use the particular parameter to combine multiple received web resources when generating a search result.

Each web resource system in the subset of the web resource systems 112a-n can use any appropriate process to determine web resources responsive to the request. For instance, a web resource system can use the received parameters to determine web resources that are at least partially responsive to the search query. The web resource system can access a corresponding database maintained by the web resource system, e.g., on one or more computers, to determine the at least partially responsive web resources. The web resource system can send, to the search system 104, data for each of the at least partially responsive web resources that the web resource system determined.

After sending the requests for web resources to the subset of the web resource systems 112a-n, the search system 104 can receive web resources from one or more web resource systems 112a-n in the subset. For example, some of the web resource systems might determine that they do not have web resources that are responsive, at least in part, to the search query. The search system 104 can receive the web resources from the other web resource systems in the subset that received the request and determined at least partially responsive web resources.

The search system 104 can generate one or more search results using the received web resources. For instance, the search system 104 can determine that a first received web resource is responsive to a first subset of the one or more parameters for the search query and a second received web resource is responsive to a second subset of the one or more parameters for the search query. The first subset and the second subset can each include parameters from the search query. In some examples, the search system 104 can determine at least some parameters in the first subset and the second subset when optimizing the search query. This optimization can include determining sub-queries for the search query, e.g., using the particular parameter or a value for the particular parameter when the parameter does not have a binary value. The sub-queries can each have their own subset of parameters. The search system can include, in the requests sent to the subset of the web resource systems 112a-n, data for the first subset and the second subset. Any responses received from the subset of the web resource systems 112a-n can indicate which web resources are responsive to which subset of parameters, which sub-query, or both.

The search system 104 can then send, to the client device 102, the one or more generated search results, e.g., in a search response. The response can include instructions, e.g., generated by a graphical user interface ("GUI") 116, to cause the client device 102 to display at least some of the search results, e.g., on a display 118.

When the client device 102 receives the response, the client device 102 can present at least some of the search results, e.g., on the display 118. For instance, when the client device 102 receives the response, the client device 102 can identify the instructions in the response. The client device 102 can use the instructions to present some search results from the response. The instructions can identify a requesting application 120 that generated the search query. The client device 102 can provide the search results to the requesting application 120 so that the requesting application 120 can present the search results.

The client device 102 can present some of the received search results in any appropriate manner. For instance, the client device 102 can present a search result audibly, e.g., using a speaker, visibly, e.g., on the display 118, or both.

The search system 104 and the web resources systems 112a-n are examples of a system implemented as computer programs on one or more computers in one or more locations, in which the systems, components, and techniques described in this document are implemented. The client device 102 can include personal computers, mobile communication devices, and other devices that can send and receive data over a network 108. The client device 102 includes, or is capable of accessing, an application 120. The application 120 is an application that enables the client device 102 to submit a search query to the search system 104. The client device 102 can transmit the search query to the search system 104 over the network 108, e.g., the internet, a local area network ("LAN"), or wide area network ("WAN").

The application 120 can be presented on a display 118, e.g., an integrated display, an external display, or both, that is connected to the client device 102. The application 120 can provide, to the display 118, instructions for presentation of an interface for the application 120 on the display 118, e.g., so that a user can interact with the application 120 to submit the search query to the search system 104.

The search system 104 can include several different functional components, including the optimization engine 110 and the GUI engine 116. The optimization engine 110, the GUI engine 116, or a combination of these, can include one or more data processing apparatuses. For instance, each of the optimization engine 110 and the GUI engine 116 can include one or more data processors and instructions that cause the one or more data processors to perform the operations discussed in this specification.

The various functional components of the search system 104, one or more of the web resources systems 112a-n, or a combination of both, may be installed on one or more computers as separate functional components or as different modules of a same functional component. For example, the optimization engine 110, the GUI engine 116, the databases, or a combination of two or more of these, can be implemented as computer programs installed on one or more computers in one or more locations that are coupled to each through a network. In cloud-based systems for example, these components can be implemented by individual computing nodes of a distributed computing system.

This specification generally describes search queries for web resources. The web resources can be any appropriate web resources, e.g., such that a single search result identifies two or more web resources which combined are responsive to a search query even though any of the two or more web resources alone is not completely responsive to the search query. In some implementations, the search query can be a query for a web based travel booking service. Although some examples are discussed with reference to web based travel booking services, the systems and methods described in this specification can be used in any other appropriate environment that may benefit from searching a subset of databases that have web resources at least partially, or only partially, responsive to a search query. For instance, the systems and methods described in this specification can be used by a search system to search alternative itineraries using multi-city searches with induced same-day stopovers.

In some implementations, the search system can be part of a travel agent system that has access to multiple travel reservation databases of suppliers in many countries. Suppliers may be referred to as companies or travel service providers, such as airlines, trains, buses, cruise lines, hotels, rental car companies etc. In some examples, suppliers can provide accommodation, transportation, or both, services to the customers.

Transportation, e.g., airfare, train, bus, or a combination of these, pricing can be a complex problem due to the large number of possible solutions to a given set of travel requirements, and rapidly changing supply, demand, or both, dynamics. Airline companies might need to estimate the supply and demand for all origin-destination pairs and optimize their pricing accordingly. But carrier pricing is not perfect, and inefficiencies that provide opportunities for unique content or prices exist.

Figure 2:
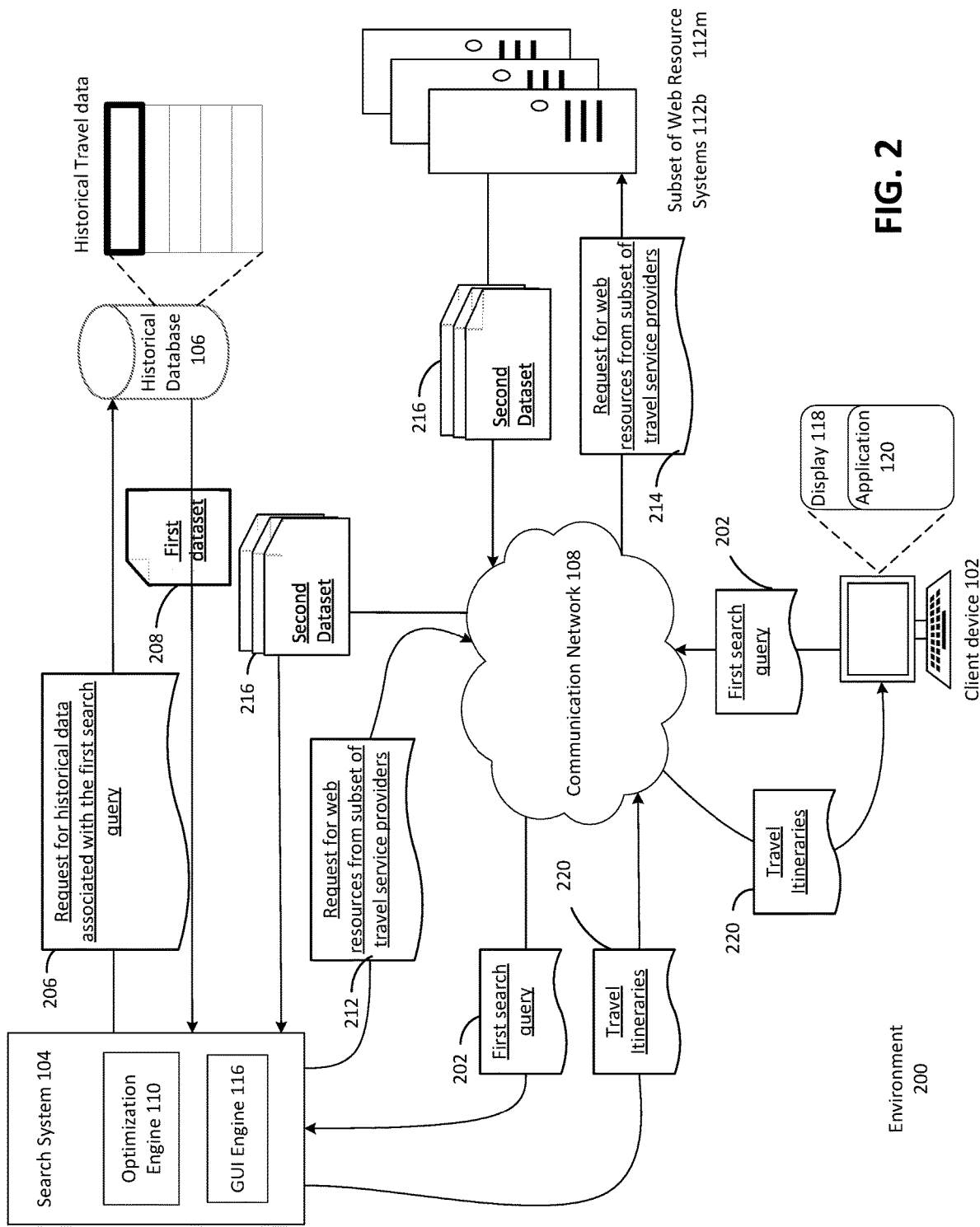
FIG. 2 depicts an example of an environment in which the search system predicts a subset of web resource systems that are most likely to have web resources that are responsive to a query.

FIG. 2 depicts an example of an environment 200 in which the search system 104 predicts a subset of web resource systems 112b-m that are most likely to have web resources that are responsive to a query. In some examples, the environment 200 can be the same environment as the environment 100. In this example, the search system 104 can generate travel itineraries using historical travel itineraries in response to a search query for a travel reservation request. More generally, the search system 104 can generate respective travel itineraries for each of multiple search queries from each of multiple different client devices. For convenience, the search system 104 is described as receiving a first search query from a single client device but the search system 104 can perform the same process for each of the multiple search queries received from a different, respective client device.

The client device 102 transmits a first search query 202 that includes one or more parameters for a travel itinerary request to a search system 104. For instance, the client device 102 can receive input that specifies the one or more parameters, e.g., from an input device. The input device can be triggered by a user of the client device 102 to generate the input. The client device 102 can transmit a search query 202, to the search system 104, that specifies one or more of pricing information, layover candidates, respective service providers, departure date, return date, or any combination of these for a travel itinerary request between an origin and a destination. For example, the first search query can specify a request for travel itineraries between two airports, e.g., CVG to DCA, BOS to DTW, etc.

The first search query 202 can include a particular parameter, e.g., a predetermined parameter. For instance, the first search query 202 can include a field for the particular parameter. The particular parameter can indicate whether search results with one or more layovers are responsive to the first search query 202.

The search system 104 receives the first search query 202. The search system 202 can determine whether one of the parameters in the first search query 202 is a particular parameter for which the search system 104 should access a subset of multiple web resources systems, e.g., subset of travel service provider system(s) 112b-m.

For instance, the particular parameter can include a condition that the travel itinerary request enables one or more layover candidates between an origin and a destination specified by the search query. For example, the particular parameter can indicate that the search system 104 can return travel itineraries that include multi-city travel itineraries.

For example, for a travel itinerary request that identifies BOS as an origin and CHI as a destination, layover candidates can include, e.g., ATL, DCA, DTW, or any combination of these.

If the search system 104 determines that a first parameter from the first search query 202 is the particular parameter, the search system 104 transmits a request 206 for historical data associated with the first search query to a historical database 106. The historical data can include pricing information, layover candidates, travel service providers, or a combination of two or more of these.

The historical database 106 can be a storage system that includes historical travel data, e.g., historical search queries, historical search results such as historical itineraries, historical travel segments, or a combination of two or more of these. For instance, the historical travel data can include pricing information, layover candidates, and travel service providers for each of one or more historical travel itineraries. The historical travel itineraries can be travel itineraries from a previous span of time before the present point in time, e.g., at least a threshold time period before the search system 104 received the first search query 202.

For example, the historical travel itineraries can include travel itineraries from a predetermined past time point until the present time point, e.g., the time point when the search query submitted by the client device 102 is received by the search system 104 or the time point when the search system 104 queries the historical database 106, or until at least a threshold time period before the search system 104 received the first search query 202. In another example, the historical travel itineraries can include travel itineraries from a span of time having a predetermined duration based on a reference point, such as travel itineraries from a predetermined period of time before receipt of the first search query 202, e.g., from the previous five days, two weeks, or six months before the present time point, or from a span of time between two predetermined dates.

The search system 104 can retrieve historical search data, e.g., a first dataset 208, from the historical database 106. In some examples, the historical database 106 can perform one or more operations as part of the search system 104 retrieval of the historical search data from the historical database 106. The historical database 106 can be part of the search system 104. The historical search data can include historical search results, e.g., historical travel itineraries, historical web resources, e.g., historical itinerary legs, historical travel service providers, or a combination of both. The historical database 106 retrieves historical search data that each satisfy at least some of the parameters from the first search query 202.

The historical database 106 can determine historical search queries that have at least a threshold level of similarity to the first search query 202. The historical database 106 can use the historical search queries to retrieve the historical search data.

The historical database transmits the first dataset 208, e.g., the retrieved historical search data, to the search system 104. For instance, the historical database 106 can transmit the first dataset 208 such that each historical travel itinerary included in the first dataset 208 satisfies at least one of the parameters for the first search query. The first dataset 208 can identify or be used to identify historical web resource systems, e.g., travel service providers, from which historical web resources were received.

For example, the first search query can specify one or more conditions for price, layover candidates, travel service providers, origins, destinations, departure dates, return dates, or any combination of these. As particular examples, the one or more conditions can include travel itineraries below a specified price, within a specified range, or above a specified price; specified layover candidates, or a specified number of layover candidates; travel service providers specified for inclusion, or exclusion; or any combination of these.

The search system 104 includes an optimization engine 110. The optimization engine 110 predicts, using the historical data in the first dataset 208, a subset of multiple service providers associated with a subset of travel service provider systems 112*b-m*. The subset of service providers can include service providers that are predicted to have layover candidates that are more responsive to the first search query 202 than other layover candidates, e.g., are predicted to have lower prices.

For instance, the optimization engine 110 receives the first dataset 208, e.g., the historical search data, from the database 106. The optimization engine 110 can determine which web resources included in or otherwise identified by the first dataset 208 are likely most responsive to the first search query 202. The web resources that are likely most responsive to the first search query can be the resources with the shortest travel leg time, shortest layover time, lowest cost, lowest combined cost with other web resources, some other optimized parameter, or a combination of two or more of these.

The optimization engine 110 can determine, using the web resources that are likely most responsive to the first search query 202, corresponding databases maintained by the web resource systems 112*a-n* from which the web resources were retrieved. The optimization engine 110 can determine the web resources systems 112*a-n* that maintain the determined databases as the subset of web resource systems 112*b-m*.

In some implementations, the optimization engine 110 can predict a price for one or more of the web resources, e.g., one or more layover candidates. The optimization engine 110 can use the predicted price to determine the subset of web resource systems 112*b-m*. The optimization engine 110 can iterate over multiple layover candidates to determine the respective price for each layover candidate given the set of origin, destination, departure date, and return date inputs.

For instance, the optimization engine 110 can iterate over all received layover candidates for the origin and destination pair in order to determine a predetermined number of layover candidates that correspond to the cheapest candidates.

In some implementations, the optimization engine 110 can iterate over multiple layover candidates to determine the respective price for each layover candidate given a hypothetical layover city. The optimization engine 110 can iterate over the multiple layover candidates for each hypothetical layover city from multiple hypothetical layover cities. A hypothetical layover city can be predetermined, e.g., based on user input. The optimization engine 110 can determine the multiple layover candidates dynamically, e.g., given an origin and a destination.

In some examples, the optimization engine 110 can process a shared embedding for one or more parameters describing one or more or all segments of each leg of a multi-leg flight, e.g., generated by an embedding neural network, to predict the price for the multi-leg flight. For instance, a shared embedding layer can be used to represent airports, regardless of whether the airports play the role of origin or destination, or if the airports appear in one-way versus round-trip itineraries.

Processing a shared embedding for the one or more parameters can enable the optimization engine 110 to leverage historical data for prior search queries to answer novel search queries not found in the training data used to train the optimization engine. For instance, processing shared embeddings can enable the optimization engine 110 to leverage historical data such as prices, availability, and airlines from historical one-way flights to answer novel multi-legged search queries. In some examples, the optimization engine 110 can leverage one or more of the historical one-way flights to estimate the prices of one or more legs of a novel multi-legged search query.

The optimization engine 110 can have any appropriate architecture. For example, the optimization engine 110 can be a machine learning model, such as a neural network, a support vector machine, etc. The optimization engine 110 can be a deep neural network. The optimization can be a 10-layer-deep neural network. The optimization engine 110 can have skip connections, e.g., to improve the training process. The optimization engine 110 can have one or more embedding layers, e.g., for categorical features. The optimization engine 110 can use the embedding layers to combine the categorical features with numerical features at an early stage. One or more of the embedding layers can use shared embeddings, e.g., for individual web resources. In some examples, the optimization model 110 can be a neural network that includes multiple fully-connected neural network layers with residual connections, e.g., around 10 or exactly 10 fully-connected neural network layers.

For example, if optimization engine is a neural network, the neural network can have any appropriate neural network architecture that enables it to perform its described functions, e.g., processing the given the set of origin, destination, departure date, return date, and layover candidate input to predict an estimated price for an itinerary which includes the layover candidate. In particular, the neural network can include any appropriate types of neural network layers (e.g., fully-connected layers, attention-layers, convolutional layers, etc.) in any appropriate numbers, and connected in any appropriate configuration (e.g., as a linear sequence of layers). In a particular example, the neural network can include multiple, e.g., 10, fully-connected neural network layers with residual connections.

The neural network can be trained using any appropriate training objective function and using training data that includes multiple training examples. Each training example can include a training network input and a target output that should be generated by the neural network by processing the training network input. For instance, each training network input can include one or more parameters, e.g., origin, destination, departure date, return date, layover candidate input, or any combination of these; and the corresponding target output can include one or more output values, e.g., a target price, a target price quantile, availability, conversion/purchase, or any combination of these. The training objective function can measure, for each training example, an error between the target output and an output generated by the neural network after processing the training network input, e.g., a function of one or more of the target price, target price quantile, availability, or conversion/purchase likelihood, such as a linear combination of one or more of these.

The search system 104 transmits a request 212 for web resources to the subset of the web resource systems 112*b-m*. The search system 104 can transmit the request 212 over the network 108. The network 108 receives the request 212 and forwards the request 212 to the subset of the web resource systems 112*b-m*.

The subset of web resource systems 112*b-m* receives the request 214 for web resources from the search system 104. The web resource systems 112*b-m* can determine a second dataset 216 that includes web resources, e.g., travel itineraries or itinerary legs, that each satisfy at least one parameter of the first search query 202. For instance, the second dataset 216 can include travel itinerary legs for each layover candidate predicted by the optimization engine 110 that each satisfy one or more of a respective price satisfying a threshold, or a respective total time duration for the travel itinerary satisfying a specified time threshold, or are from a respective service provider.

The subset of web resource systems 112*b-m* transmits the second dataset 216 to the search system 104 over the network 108. The network 108 can forward the second dataset 216 to the search system 104.

The search system 104 receives the second dataset 216. The search system 104 can process, e.g., using the route optimization engine 110 or another component, the second dataset 216 to generate search results, e.g., travel itineraries 220, that are responsive to the first search query 202.

For instance, given the flight from BOS to CHI, the optimization engine 110 can determine multiple web resources, e.g., itinerary leg, combinations for flights from BOS to CHI. The optimization engine 110 can generate a search result for each of the combinations. For example, the optimization engine 110 can determine that a first travel itinerary will include a first leg from BOS to DCA given a first web resource received from a first web resource system 112*j*. The optimization engine 110 can determine that the first travel itinerary will include a second leg from DCA to CHI given a second web resource received from a web resource system, whether the first web resource system 112*j* or another web resource system 112*k*. The optimization engine 110 can then generate a search result for the first travel itinerary, which search result includes data for the first leg and the second leg.

The search system 104 includes a graphical user interface ("GUI") engine 116. The GUI engine 116 can generate instructions that cause the client device 102 to present a graphical user interface for presentation of the search results, e.g., the travel itineraries 220. For instance, the GUI engine 116 can determine an application that generated the first search query 202, whether a web browser or another application 120 that executes on the client device 102. The GUI engine 116 can generate the instructions using a type of the determined application.

The search system 104, e.g., the optimization engine 110 or the GUI engine 116, can combine the search results with the instructions. For instance, the search system 104 can create one or more packets that combined include data for the search results and the instructions. The search system 104 can transmit the travel itineraries 220 and the instructions to the client device 102 to cause the client device to present at least some of the search results, e.g., the travel itineraries 220.

The client device 102 receives the travel itineraries 220 and the instructions to present the travel itineraries 220. The client device 102 includes, or is capable of accessing, an application 120. The application 120 is an application that enables the client device 102 to process the instructions to present the graphical user interface for presentation of the travel itineraries 220. For instance, the client device 102 can use the application 120 to present data for the travel itineraries 220 on one or more displays 118, e.g., an integrated display, an external display, or both, that is connected to the client device 102. The application 120 can provide, to the display 118, the instructions received from the search system 104 or instructions generated by the application 120 so that the display presents at least some of the search results, e.g., travel itineraries 220.

In some implementations, the optimization engine 110 can generate search results that each have a corresponding identifier. The optimization engine 110 can associate each of the web resources used to generate any particular search result with the corresponding identifier for the particular search result. For instance, when the web resources are legs of an itinerary, e.g., individual flights, the optimization engine 110 can generate a search result that identifies a potential itinerary based on the various legs for the potential itinerary. The various legs can be associated with an identifier for the potential itinerary.

The identifier can enable the client device 102 to perform an action for the search result that uses each of the web resources for the search result. For instance, the client device 102 can use the identifier for the potential itinerary to book the various legs for the potential itinerary, e.g., when each of the various legs is a corresponding flight, bus ride, train ride, or other mode of travel or travel accommodation.

The use of a single identifier for the web resources associated with a search result can increase a likelihood that the client device 102 will get access to those web resources, e.g., when access to those web resources might be limited. For instance, when the web resources are cloud computing resources, the client device 102 can use the single identifier to reserve use of those resources, reducing the likelihood that the client device 102 does not get those resources, might have to select less optimal computer resources when separate identifiers and transactions are required to reserve the resources, or a combination of both. In some examples, the use of a single identifier can increase the optimization of the selected resources when the combination of the resources for the search result is not necessarily the sum of the individual web resources, e.g., for total cost, total computational power, or some other appropriate combination.

Figure 3:
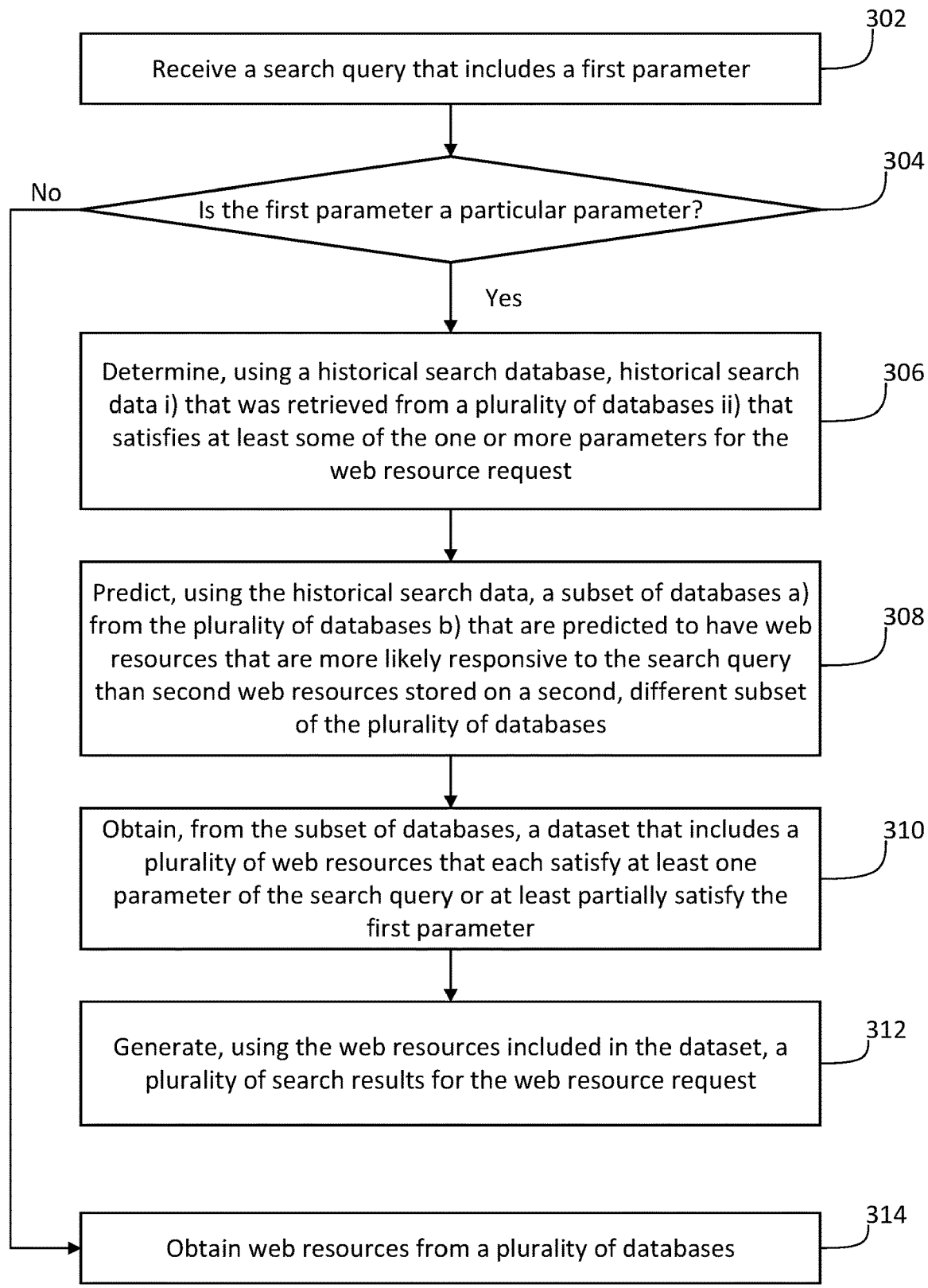
FIG. 3 is a flow diagram of a process for optimizing search result generation.

FIG. 3 is a flow diagram of a process 300 for optimizing search result generation. For example, the process 300 can be used by the search system 104 from the environment 100.

A search system receives a search query that includes a first parameter (302). The search query can include one or more parameters for a travel itinerary request, e.g., origin, destination, departure date, return date, cabin class, baggage preferences, carbon emissions preferences, flexibility preferences, airline alliance preferences, time-of-day preferences, price versus inconvenience tradeoff preferences, pricing information, layover candidates, respective service providers, or any combination of these. For instance, the search system can receive the search query from a client device.

In some implementations, the search query can include, in addition to or instead of the above example parameters, one or more other parameters for other travel options for the travel itinerary request. For instance, the other travel options can include, e.g., hotels, rental cars, package deals, or any combination of these. The package deals can include combinations of one or more other travel options offered as a single purchase, e.g., a flight itinerary with a hotel at a particular layover candidate in the flight itinerary. The one or more other parameters can include, e.g., enabling searching for hotels, enabling searching for car rentals, enabling searching for travel itineraries involving travel by multiple modalities (e.g. bus, train, air, ride-share taxi), enabling package deals, hotels within a specified number of miles to the airport, hotel price, hotel check-in date, hotel check-out date, hotel room class, hotel room number of beds, hotel size of bed, rental car class, rental car size, rental car make, rental car model, rental car age, package deal provider, or any combination of these.

The search system can determine whether the first parameter is a particular parameter (304). For instance, the search system can access a field, included in the search query, for the first parameter. The field can include an identifier for the parameter type of the first parameter, the first parameter can be at a particular location in the search query, or both. The search system can use the identifier, the location, or both, to determine whether the first parameter is the particular parameter.

In response to determining that the first parameter is the particular parameter, the search system determines, using a historical search database, historical search data i) that was retrieved from a plurality of databases ii) that satisfies at least some of the one or more parameters for the web resource request (306). For instance, the search system can retrieve the historical search data from the historical search database directly, e.g., by executing one or more database queries on the historical search database. In some examples, the search system can send, to the historical search database, a request for the historical search data and the historical search database can generate the historical search data and then send the historical search data to the search system.

The search system predicts, using the historical search data, a subset of databases a) from the plurality of databases b) that are predicted to have web resources that are more likely responsive to the search query than second web resources stored on a second, different subset of the plurality of databases (308). The search system can predict the subset of databases using the first parameter.

The search system obtains, from the subset of databases, a dataset that includes a plurality of web resources that each satisfy at least one parameter of the search query or at least partially satisfy the first parameter (310). The search system can send a query to each database in the subset of databases, or corresponding systems that maintain the respective database. The query can include one or more parameters from the search query and request web resources responsive to the search query, at least in part. A web resource can satisfy at least one parameter of the search query by, for example, having an itinerary leg that connects to an origin or a destination for a requested travel itinerary.

The search system generates, using the web resources included in the dataset, a plurality of search results for the web resource request (312). Each of the search results can identify data from the web resources that was used to generate the respective search result. For example, when a search result is for a travel itinerary that identifies two itinerary legs, the search system can generate the search result using a first web resource that indicates the first itinerary leg and a second web resource that indicates the second itinerary leg.

In response to determining that the first parameter is the particular parameter, the search system obtains web resources from multiple databases (314). The multiple databases includes more databases than the subset of databases. The multiple databases can be the plurality of databases from which the subset of databases was predicted.

The order of steps in the process 300 described above is illustrative only, and optimizing search result generation can be performed in different orders. For example, the search system can perform one or more steps in the process 300 multiple times, which can include performing step 304 then step 314 following by performing step 304 again and then step 306.

In some implementations, the process 300 can include additional steps, fewer steps, or some of the steps can be divided into multiple steps. For example, the search system can perform steps 304, 306, and 308 without performing the other steps in the process 300. This can include sending one or more requests to the subset of databases for web resources that each satisfy at least one parameter of the search query. This can reduce the amount of network bandwidth required by the search system because the search system sends the requests to only the subset of databases rather than all databases in the plurality of databases. This can reduce processing time because the search system need only generate requests for the databases in the subset of databases rather than all databases in the plurality of databases.

In some implementations, the process 300 can include sending one or more of the generated search results to the client device, e.g., from which the search query was received. Sending the search results can cause the client device to present at least one of the search results, e.g., visually or audibly.

In some implementations, the search system can, after obtaining the dataset from the subset of databases and for the search query, obtain a second dataset that includes second web resources from at least one database in a second, disjoint set of databases, e.g., a disjoint subset of the set of databases. The second, disjoint set of databases can be disjoint from the subset of databases. The second, disjoint set of databases can be from the plurality of databases. The search system can generate, using the second web resources, a second set of search results for the web resource request. The search system can provide, to the client device, instructions to cause the client device to present a user interface that includes second data for the second set of search results.

The search system can obtain the second dataset when one or more conditions are met. For instance, the search system can obtain the second dataset after a predetermined period of time. In some examples, the search system can obtain the second dataset in response to determining that the client device likely did not select any search results in the original set of search results. In some examples, the search system can obtain the second dataset in response to determining that the original set of search results did not satisfy a predetermined threshold, e.g., that a minimum duration of the durations of the travel itineraries in the set of search results exceeded a predetermined threshold, that a minimum price of the prices of the travel itineraries in the set of search results exceeded a predetermined threshold, or both.

The search system can update the second dataset one or more times, using any appropriate combination of the above criteria. For instance, the search system can update the second dataset after every lapse of a predetermined time duration. In another example, the search system can obtain the second dataset after the predetermined period of time, and then update the second dataset after determining that the client device likely did not select any search results in the second set of search results.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous. Model training, live model inference, or both, can be performed using accelerated computing hardware, such as a graphics processing unit, a tensor processing unit, multi-core/massive-core computing platforms, or a combination of two or more of these.

What is claimed is:

1. A method implemented by a data processing system for generating search results, the method comprising:

receiving, by one or more computers over a network, a search query submitted by a client device, the search query specifying one or more parameters including a first parameter for a web resource request;

determining whether the first parameter from the search query is a predetermined parameter, the predetermined parameter including a condition that the web resource request enable one or more layover candidates between an origin and a destination specified by the search query;

in response to determining that the first parameter from the search query is a predetermined parameter:

determining, by the one or more computers and using a historical search database, historical search data that was retrieved from a plurality of databases, the historical search data satisfying a threshold similarity to the search query, the historical search data comprising historical travel itineraries including layover candidate data;

inputting the historical search data comprising the historical travel itineraries including the layover candidate data into a machine learning model configured to analyze the historical search data and (1) determine prior search results that are responsive to at least a first threshold number of parameters from the one or more parameters and (2) determine prior web resources that are responsive to at least a second threshold number of parameters from the one or more parameters included in the search query;

predicting, based at least in part on utilizing the machine learning model, a subset of databases from the plurality of databases that are predicted to have first layover candidates that are more likely to be associated with lower prices relative to second layover candidates stored on a second, different subset of the plurality of databases that are predicted to have higher prices; and obtaining, from the subset of databases, a dataset that includes a plurality of layover candidates that each satisfy at least one parameter of the search query or at least partially satisfy the first parameter;

generating, by the one or more computers and using the plurality of layover candidates included in the dataset, a plurality of search results for the web resource request; and providing, to the client device, instructions to cause the client device to present a user interface that includes data for the plurality of search results.

2. The method of claim 1, wherein:

obtaining the dataset comprises receiving, from each database in the subset of databases, one or more layover candidates that are each partially responsive to the web resource request including a first layover candidate received from a first database and a second layover candidate received from a second database; and generating the plurality of search results comprises generating a first search result using the first layover candidate obtained from the first database in the subset of databases and the second layover candidate obtained from the second database in the subset of databases.

3. The method of claim 1, wherein determining the historical search data comprises determining, using the historical search database, the historical search data i) that was retrieved from the plurality of databases ii) that includes multiple search results each of which satisfies all of the one or more parameters for the web resource request.

4. The method of claim 1, wherein the web resource request comprises a travel reservation request.

5. The method of claim 4, wherein generating the plurality of search results comprises generating, using a first web resource that identifies a first itinerary leg and a second web resource that identifies a second itinerary leg, a search result that has a total itinerary that includes the first itinerary leg and the second itinerary leg.

6. The method of claim 1, wherein the plurality of databases comprises the subset of databases and a second, disjoint subset of databases, the method comprising:

after obtaining the dataset, obtaining, from at least one database in the second, disjoint subset of databases, a second dataset that includes a second plurality of layover candidates;

generating, using the second plurality of layover candidates included in the second dataset, a second plurality of search results for the web resource request; and providing, to the client device, instructions to cause the client device to present a user interface that includes second data for the second plurality of search results.

7. A system comprising one or more computers and one or more storage devices on which are stored instructions that are operable, when executed by the one or more computers, to cause the one or more computers to perform operations for generating search results, the operations comprising:

receiving, by the one or more computers over a network, a search query submitted by a client device, the search query specifying one or more parameters including a first parameter for a web resource request;

determining whether the first parameter from the search query is a predetermined parameter, the predetermined parameter including a condition that the web resource request enable one or more layover candidates between an origin and a destination specified by the search query;

in response to determining that the first parameter from the search query is a predetermined parameter:

determining, by the one or more computers and using a historical search database, historical search data that was retrieved from a plurality of databases, the historical search data satisfying a threshold similarity to the search query, the historical search data comprising historical travel itineraries including layover candidate data;

inputting the historical search data comprising the historical travel itineraries including the layover candidate data into a machine learning model configured to analyze the historical search data and (1) determine prior search results that are responsive to at least a first threshold number of parameters from the one or more parameters and (2) determine prior web resources that are responsive to at least a second threshold number of parameters from the one or more parameters included in the search query;

predicting, based at least in part on utilizing the machine learning model, a subset of databases from the plurality of databases that are predicted to have first layover candidates that are more likely to be associated with lower prices relative to second layover candidates stored on a second, different subset of the plurality of databases that are predicted to have higher prices; and obtaining, from the subset of databases, a dataset that includes a plurality of layover candidates that each satisfy at least one parameter of the search query or at least partially satisfy the first parameter;

generating, by the one or more computers and using the plurality of layover candidates included in the dataset, a plurality of search results for the web resource request; and providing, to the client device, instructions to cause the client device to present a user interface that includes data for the plurality of search results.

8. The system of claim 7, wherein:

obtaining the dataset comprises receiving, from each database in the subset of databases, one or more layover candidates that are each partially responsive to the web resource request including a first layover candidate received from a first database and a second layover candidate received from a second database; and generating the plurality of search results comprises generating a first search result using the first layover candidate obtained from the first database in the subset of databases and the second layover candidate obtained from the second database in the subset of databases.

9. The system of claim 7, wherein determining the historical search data comprises determining, using the historical search database, the historical search data i) that was retrieved from the plurality of databases ii) that includes multiple search results each of which satisfies all of the one or more parameters for the web resource request.

10. The system of claim 7, wherein determining the historical search data comprises determining one or more of a plurality of historical search queries, a plurality of historical search results, or a plurality of historical web resources that satisfy the threshold similarity to the search query.

11. The system of claim 7, wherein generating the plurality of search results comprises generating, using a first web resource that identifies a first itinerary leg and a second web resource that identifies a second itinerary leg, a search result that has a total itinerary that includes the first itinerary leg and the second itinerary leg.

12. A non-transitory computer storage medium encoded with instructions that, when executed by one or more computers, cause the one or more computers to perform operations for generating search results, the operations comprising:
    receiving, by the one or more computers over a network, a search query submitted by a client device, the search query specifying one or more parameters including a first parameter for a web resource request;
    determining whether the first parameter from the search query is a predetermined parameter, the predetermined parameter including a condition that the web resource request enable one or more layover candidates between an origin and a destination specified by the search query;
    in response to determining that the first parameter from the search query is a predetermined parameter:
        determining, by the one or more computers and using a historical search database, historical search data that was retrieved from a plurality of databases, the historical search data satisfying a threshold similarity to the search query, the historical search data comprising historical travel itineraries including layover candidate data;
        inputting the historical search data comprising the historical travel itineraries including the layover candidates into a machine learning model configured to analyze the historical search data and (1) determine prior search results that are responsive to at least a first threshold number of parameters from the one or more parameters and (2) determine prior web resources that are responsive to at least a second threshold number of parameters from the one or more parameters included in the search query;
        predicting, based at least in part on utilizing the machine learning model, a subset of databases from the plurality of databases that are predicted to have first layover candidates that are more likely to be associated with lower prices relative to second layover candidates stored on a second, different subset of the plurality of databases that are predicted to have higher prices; and
        obtaining, from the subset of databases, a dataset that includes a plurality of layover candidates that each satisfy at least one parameter of the search query or at least partially satisfy the first parameter; and
    generating, by the one or more computers and using the plurality of layover candidates included in the dataset, a plurality of search results for the web resource request; and
    providing, to the client device, instructions to cause the client device to present a user interface that includes data for the plurality of search results.

13. The method of claim 1, wherein determining whether the first parameter is the predetermined parameter comprises determining whether the first parameter indicates that a quantity of databases from the plurality of databases that include data potentially responsive to the search query satisfies a quantity threshold.

14. The method of claim 1, wherein the predetermined parameter indicates that the one or more computers are to determine a first search query for a first web resource and a second search query different than the first search query for a second web resource system.

15. The method of claim 1, wherein the first layover candidates that are more likely responsive to the search query relative to the second layover candidates stored on the second, different subset of the plurality of databases further comprise one or more of a shorter travel leg time, a shorter layover time, or lower combined cost relative to the second layover candidates.

16. The method of claim 1, wherein the search query specifies a second parameter different than the first parameter, wherein the second parameter is not a predetermined parameter for which the one or more computers should access a proper subset of databases from the plurality of databases.

17. The method of claim 1, wherein determining the first parameter is a predetermined parameter is further based at least in part on a location of the first parameter in the search query.

18. The method of claim 1, wherein the historical search data further comprises one or more of pricing data, or travel service provider data for each of one or more historical travel itineraries determined to satisfy at least some of the one or more parameters from the search query.

19. The method of claim 1, further comprising:
    predicting, based at least in part on the historical search data, a price for the one or more layover candidates; and
    determining, based at least in part on the price, the subset of databases.

20. The method of claim 1, wherein the predetermined parameter further instructs the one or more computers to determine an additional query parameter that is likely to increase a responsiveness of the search query.

* * * * *